US011205196B1

(12) United States Patent
Raviv (10) Patent No.: US 11,205,196 B1
(45) Date of Patent: Dec. 21, 2021

(54) SYSTEMS AND METHODS FOR GENERATING TRAVEL-RELATED RECOMMENDATIONS USING ELECTRONIC COMMUNICATION DATA

(71) Applicant: Oath Inc., Dulles, VA (US)

(72) Inventor: Ariel Raviv, Haifa (IL)

(73) Assignee: Verizon Media Inc., New York, NY (US)

( * ) Notice: Subject to any disclaimer, the term of this patent is extended or adjusted under 35 U.S.C. 154(b) by 47 days.

(21) Appl. No.: 16/502,911

(22) Filed: Jul. 3, 2019

(51) Int. Cl.
| | |
|---|---|
| G06Q 30/00 | (2012.01) |
| G06Q 30/02 | (2012.01) |
| G06N 20/00 | (2019.01) |
| H04L 29/08 | (2006.01) |
| H04L 12/58 | (2006.01) |
| G06Q 50/14 | (2012.01) |
| G06F 40/295 | (2020.01) |
| G05B 19/418 | (2006.01) |

(52) U.S. Cl.
CPC ....... *G06Q 30/0271* (2013.01); *G06F 40/295* (2020.01); *G06N 20/00* (2019.01); *G06Q 50/14* (2013.01); *H04L 51/046* (2013.01); *H04L 67/306* (2013.01)

(58) Field of Classification Search
CPC .. G06Q 30/0271; G06Q 50/14; G06F 40/295; G06N 20/00; H04L 51/046; H04L 67/306
See application file for complete search history.

(56) References Cited

U.S. PATENT DOCUMENTS

| | | | | |
|---|---|---|---|---|
| 11,010,436 | B1* | 5/2021 | Peng | G06F 16/24578 |
| 2008/0319649 | A1* | 12/2008 | Nath | G06Q 50/14 |
| | | | | 701/439 |
| 2017/0061286 | A1* | 3/2017 | Kumar | G06Q 30/0269 |
| 2019/0347668 | A1* | 11/2019 | Williams | H04L 67/2833 |
| 2020/0065857 | A1* | 2/2020 | Lagi | G06F 16/9535 |
| 2020/0334641 | A1* | 10/2020 | Singh | G06Q 10/1095 |

OTHER PUBLICATIONS

"On-demand feature recommendations derived from mining public product descriptions". (Year: 2011).*
Castro, D. Di et al., "Automated Extractions For Machine Generated Mail", (https://research.yahoo.com/publications/8972/automated-extractions-machine-generated-mail), Apr. 23, 2018.

* cited by examiner

*Primary Examiner* — Maria V Vanderhorst
(74) *Attorney, Agent, or Firm* — Bookoff McAndrews, PLLC (57) ABSTRACT

Disclosed are systems and methods for generating recommendations to users based on historical travel information and electronic communication data. The disclosed systems and methods provide a novel framework for automating the transmission of electronic travel-related recommendations to users by consistently monitoring electronic messages received at an electronic communication mailbox corresponding to a user. The disclosed framework operates by leveraging historical user data, data parsed from electronic communication mailbox corresponding to a user, or various vendor information, and using the aforementioned data as inputs for travel-related recommendation models, in order to generate and transmit the optimal travel-related recommendations to a user.

20 Claims, 6 Drawing Sheets

SYSTEMS AND METHODS FOR GENERATING TRAVEL-RELATED RECOMMENDATIONS USING ELECTRONIC COMMUNICATION DATA

DETAILED DESCRIPTION

Technical Field

The present disclosure relates to techniques for generating recommendations to users based on historical travel information and electronic communication data.

Background

Tourism is one of the fastest growing industries today, contributing trillion of dollars to the world economy, with the Internet playing an important part of its rapid growth. Today, travelers use a combination of a large variety of services in order to plan and book their trips. These services still include offline channels, such as phone calls or face-to-face meetings with service providers, as well as online services, such as travel fare aggregators, travel agencies, travel metasearch engines, and so on. Similar techniques are used by travelers who research travel options on their phones and, later, finalize the booking on a desktop computer.

Many websites and applications exist to make user travel recommendations or present targeted travel content regarding user interests. As a result, the details of the user's travel plans are typically scattered among several service providers, where each provider holds a narrow piece of information regarding any given upcoming trip (such as the date of arrival or the method of transportation). In such cases, each newly booked provider is not aware of the preferences and the past behavior of the users, unless those preferences are input explicitly. Conventional services typically rely solely on user input data in order to determine the best recommendation to present to a user and these services typically are not privy to user data not received at the service directly. For example, a typical travel website will only become privy to a user's interest in making travel arrangements when the user accesses the travel website and provides input indicative of the user's interest. Additionally, a typical travel website transmits targeted travel content only based on previous information input by a user engaging with the travel website. Moreover, these conventional services do not have access to data which would provide a holistic view of a user's interest outside of travel. The following disclosure provides solutions to the aforementioned technological needs.

SUMMARY OF THE DISCLOSURE

Embodiments of the present disclosure include systems and methods for generating of travel-related offerings using electronic communication data.

According to certain embodiments, computer-implemented methods are disclosed for recommending and displaying travel-related icons and data elements. One method may include identifying, by parsing one or more electronic communication inboxes corresponding to the user, travel-related data corresponding to future travel arrangements; filtering vender services information and historical travel information based on the travel-related data corresponding to the future travel arrangements; generating a user profile corresponding to a user based on historical travel-related information corresponding to the user; applying one or more machine learning models to the filtered vender services information in order to generate a list of candidate offers; correlating the candidate offers with a relevancy score corresponding to the travel-related data corresponding to the future travel arrangements; displaying the one or more candidate offers with the highest relevancy scores exceeding a threshold.

According to certain embodiments, systems are disclosed for recommending travel-related icons and data elements. One system may include at least one or more processors for identifying, by parsing one or more electronic communication inboxes corresponding to the user, travel-related data corresponding to future travel arrangements; filtering vender services information and historical travel information based on the travel-related data corresponding to the future travel arrangements; generating a user profile corresponding to a user based on historical travel-related information corresponding to the user; applying one or more machine learning models to the filtered vender services information in order to generate a list of candidate offers; correlating the candidate offers with a relevancy score corresponding to the travel-related data corresponding to the future travel arrangements; displaying the one or more candidate offers with the highest relevancy scores exceeding a threshold.

According to certain embodiments, non-transitory computer readable medium are disclosed for recommending travel-related icons and data elements. One non-transitory computer readable medium may include at least one storage medium with instructions thereon for identifying, by parsing one or more electronic communication inboxes corresponding to the user, travel-related data corresponding to future travel arrangements; filtering vender services information and historical travel information based on the travel-related data corresponding to the future travel arrangements; generating a user profile corresponding to a user based on historical travel-related information corresponding to the user; applying one or more machine learning models to the filtered vender services information in order to generate a list of candidate offers; correlating the candidate offers with a relevancy score corresponding to the travel-related data corresponding to the future travel arrangements; displaying the one or more candidate offers with the highest relevancy scores exceeding a threshold.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of systems and methods for recommending where to conduct a for generating recommendations to users based on historical travel information and electronic communication data.

As described above, in the field of automating recommendations, there is a need for systems and methods configured for presenting travel-related recommendations based on data points indicative of a holistic profile of a user. Conventional travel-related recommendation and targeted content techniques present users with recommendations based primarily on user input data in real-time or explore/exploit techniques implemented because of historical data the same user provided by engaging with that same travel service in the past. These conventional approaches lack techniques for analyzing data points outside of travel direct user input data. In contrast, most Internet users' electronic mail (e-mail) mailboxes or "inboxes" retain abundant information regarding the user, with travel-related details in particular typically being preserved in archived or read e-mails. Each transaction or travel booking the user makes, either by interacting with an offline or an online service provider, is typically followed by the delivery of a corresponding e-mail message comprising the relevant information (such as a purchase receipt or a travel itinerary). Providers of e-mail accounts are therefore uniquely situated to provide users with a more comprehensive overview of their travel preferences/history, and therefore more useful recommendations for additional travel bookings. By collecting details related to the trip across several vendors (e.g., flight, hotel, car, restaurant), taking into account past travel data, as well as general information about the user (such as gender, location, loyalty program, meal preference, etc.), a sophisticated model can be created to recommend travel-related products and services in a highly-personalized and accurate manner.

Accordingly, the present disclosure is directed to systems and methods for generating recommendations to users based on historical travel information and electronic communication data. As discussed herein, a user is any individual who uses an e-mail service comprising a travel recommendation system. However, the concept of a user as disclosed herein is meant to be broad and encompass scenarios in which there may be one or more users, a user group, or a combination thereof, that access a travel recommendation system.

The travel recommendation system disclosed herein may establish that a user has future travel plans, based on: parsing a user's electronic communication, a user's web browsing history, a user's online search history, new application(s) downloaded (or accessed) by the user, receiving user input, receiving data indicating an interest in travel from external servers, or any combination thereof. As disclosed herein, an "electronic communication," "electronic message," or "e-mail" may be any type of digital communication including, but not limited to, email, SMS or other text message, video calls, voice calls, social media conversations, communication with a digital or artificial intelligence enabled personal assistant personal assistants, and/or communication with a bot. One having ordinary skill in the art will recognize that a travel-related offering may include any type of digital content (e.g. media/text, promotion, advertisement, icons, data elements, selectable user interface elements, and/or communications) comprising information regarding, or even recommending, any relevant service or product corresponding to travel by the user.

In one embodiment, a server corresponding to the travel recommendation system may identify travel-related information (e.g., future travel arrangements) corresponding to one or more users, by parsing electronic communication (e.g., a text message, e-mail, social media message, communication with a digital or artificial intelligence enabled personal assistant). Based on the identified travel-related information, the travel recommendation system may filter vender services information (e.g., provided by a third party) and historical travel information. The travel recommendation system may then (or at any time) generate a user profile corresponding to the user based on historical travel-related information associated with the user and/or other information (e.g., bank information, receipts, itineraries, social media data, phone records, etc.) parsed from the user's electronic communications. The travel recommendation system may apply one or more machine learning models (supervised or unsupervised) to the filtered vender services information in order to generate a list of candidate offers to present to the user and further correlate the candidate offers with a relevancy score corresponding to the travel-related data corresponding to the future travel arrangements. The recommendation may transmit and/or present (e.g., via audio or display) one or more candidate offers with the highest relevancy scores or rank exceeding a threshold via a user interface (e.g., an application, a web browser, or via electronic communication such as a text message, e-mail or voice/video call).

Figure 1:
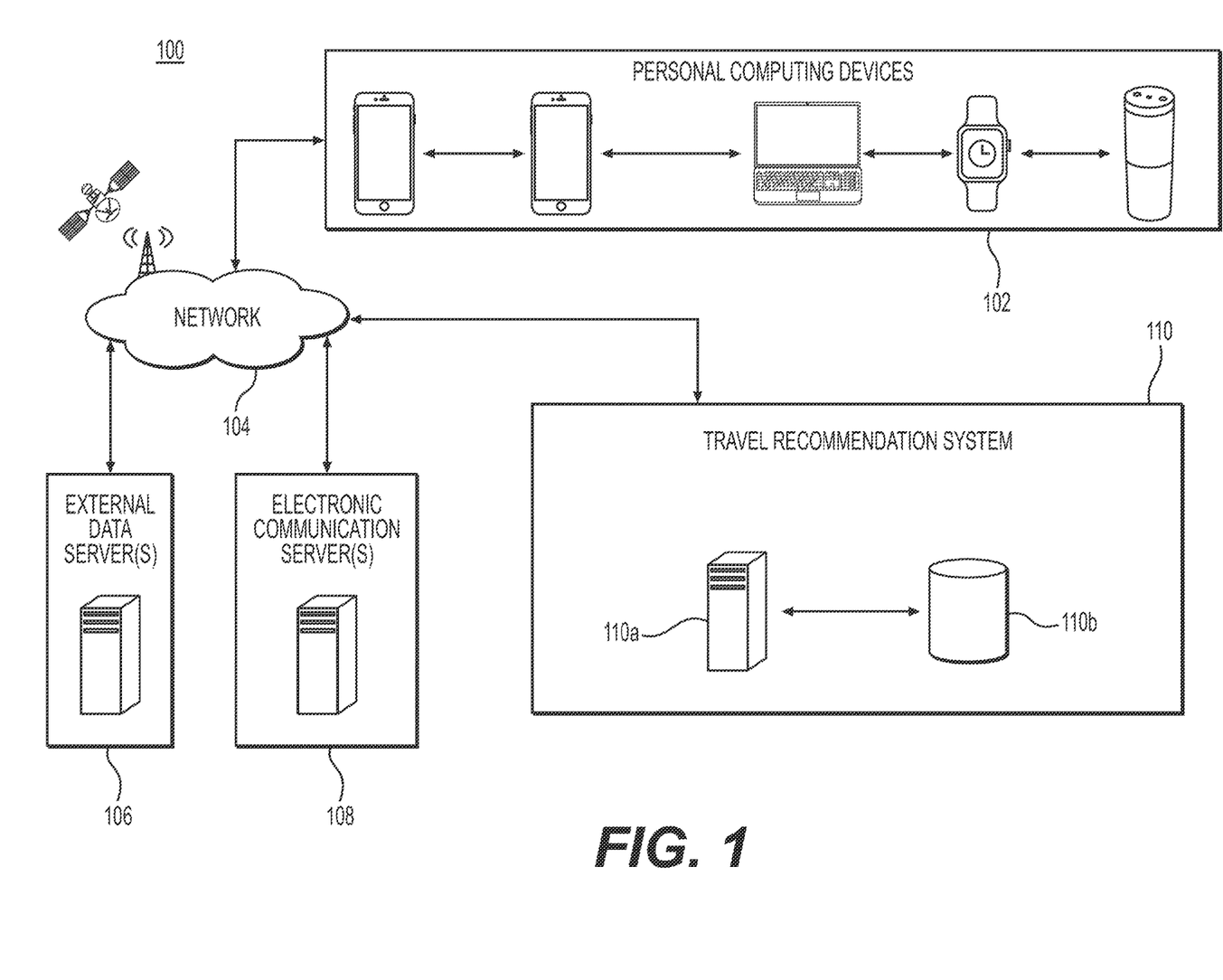
FIG. 1 is a schematic diagram illustrating an example of a computer network and environment within which the computer systems and methods disclosed herein are implemented according to some embodiments of the present disclosure.

FIG. 1 schematic diagram illustrating an example of a computing network 100, or environment, within which the travel recommendation computer systems and methods disclosed herein are implemented according to some embodiments of the present disclosure. As shown in FIG. 1, computing network 100 may include a plurality of personal computing devices 102, external data sever(s) 106, electronic communication server(s) 108, and a travel recommendation system 110, all in communication with one another via a network 104, such as the Internet.

The personal computing devices 102 may include virtually any desktop or portable computing device capable of receiving and sending a message over a network, such as network 104, or the like. For example, a personal computing device 102 may be a mobile phone, a desktop computer, a laptop computer, a landline phone, a gaming system, a television, smart accessory, and/or a digital or artificial intelligence enabled personal assistant. Personal computing devices 102 may include virtually any portable computing device capable of connecting to another computing device and receiving information, as discussed above. Personal computing devices 102 may also be configured to execute at least one native or web-based client application (e.g., a communication application) that is configured to receive communication and/or content from another computing device. In some embodiments, mobile devices (e.g., a mobile phone) may also communicate with non-mobile personal computing services (e.g., a smart speaker or smart home hub), or the like. In one embodiment, such communications may include sending and/or receiving messages or voice/video calls, searching for, viewing, and/or sharing photographs, digital images, audio clips, video clips, or any of a variety of other forms of communications. Personal computing devices 102 may be configured for sending or receiving signals, such as via a wired or wireless network, or may be configured for processing or storing signals, such as in memory as physical memory states, and may, therefore, operate as a server. Network 104 may be configured to couple personal computing devices 102 and their components with components corresponding to the travel recommendation system 110. It should be appreciated that any devices or servers of FIG. 1 may be configured to communicate with each other directly, such as through Bluetooth or any other near-field communication (NFC) protocol. Network 104 may include any of a variety of wireless sub-networks that may further overlay stand-alone ad-hoc networks, and the like, to provide an infrastructure-oriented connection for the personal computing devices 102.

In general, network 104, may include local area networks ("LANs")/wide area networks ("WANs") network, wireless network, or any combination thereof, and configured to implement protocols for transmitting data in communication computing devices accessing the travel recommendation system 110. Not all the components featured in FIG. 1 may be required to practice the disclosure, and variations in the arrangement and type of the components may be made without departing from the spirit or scope of the disclosure.

The external data server(s) 106 may include one or more of personal computers desktop computers, multiprocessor systems, microprocessor-based or programmable consumer electronics, database(s), network PCs, server(s), and the like, maintained by third parties storing business-to-business or business-to-consumer data (e.g. Verizon®, American Airlines®, Google®, Kayak®, Chase®, Amazon®, a government entity, or the like). The travel recommendation system 110 may receive data stored on the external data server(s) 106 on one or more of its computing devices. The data stored at the external data server(s) 106 may include, but is not limited to, information related to: product cost, service cost, inventory, seating availability, seating arrangements, rewards information, weather, news, transportation (e.g., public and private data related to airplanes, rocket ships, trains, and aquatic vehicles), mobile devices (e.g., iPhone®), smart accessories (e.g. Apple Watch®), artificial intelligence enabled devices (e.g. Alexa®, Google Home®, Facebook Portal®, and the like), and GPS data corresponding to a user or a personal computing device 102. For example, the travel recommendation system 110 may receive or may be able to parse data from the external data server(s) 106 pertaining to specific user(s)/member(s)/user group(s) interests or preferences on Orbitz® or Expedia® and IP addresses associated with personal computing devices receiving engaging with the service; information regarding user(s)/member(s)/user group(s) data collected by artificial intelligence personal assistants (e.g. ordering habits, user-to-user communication, reminders, user queries, and the like); personal computing device information (e.g., device signal strength, number and type of applications on the device, SIM/eSIM data, IMEI information, data stored in the cloud corresponding to the device, internet based user queries, and the like); and banking information (e.g., account balance, credit history, debt information, and the like).

The electronic communication server(s) 108 may include one or more of personal computers, desktop computers, multiprocessor systems, microprocessor-based or programmable consumer electronics, database(s), network PCs, server(s), and the like, maintained by third parties storing business-to-business or business-to-consumer data (e.g. Verizon®, Yahoo®, Google®, Microsoft®). The travel recommendation system 110 may receive data (e.g. communication data pertaining to text messages or emails) stored on the electronic communication server(s) 108 on one or more of its computing devices. For example, the travel recommendation system 110 may receive or may be able to parse data from the electronic communication server(s) 108 pertaining to specific user(s)/member(s)/user group(s) electronic communication and IP addresses associated with personal computing devices receiving engaging with the service electronic communication server(s) 108.

The travel recommendation system 110 may be further comprised of a recommendation execution cluster 110a and a data warehouse 110b. Recommendation execution cluster 110a may be configured to execute one or more travel recommendation software modules based on instructions and data stored in data warehouse 110b. The data warehouse 110b may be any type of database or memory, and may be configured to be in direct communication with the recommendation execution cluster 110a.

Recommendation execution cluster 110a may include a device that includes a recommendation analyzer (not shown) to provide recommendations to another device independently or in any type or form of content via the network 104. Devices that may operate as recommendation execution cluster 110a may include one or more of personal computers, desktop computers, multiprocessor systems, microprocessor-based or programmable consumer electronics, network PCs, server(s), and the like. Recommendation execution cluster 110a may further facilitate user access to a variety of services that include, but are not limited to, e-mail services, alert/notification(s), instant messaging (IM) services, streaming and/or downloading media services, search services, photo services, web services, social networking services, news services, third-party services, audio services, video services, SMS services, MMS services, FTP services, telephony services, voice over IP (VOIP) services, gaming services, or the like. The recommendation execution cluster 110a may be configured to automatically provide recommendations and/or one or more of the aforementioned services based on the data stored in the data warehouse 110b, external data server(s) 106, and/or information received from the personal computing devices 102 or electronic communication server(s) 108. The recommendation execution cluster 110a may be configured to perform calculations and measurements, and interpret data received from one or more personal computing devices 102, external data server(s) 106, data stored in the data warehouse 110b, and/or the electronic communication server(s) 108. The recommendation execution cluster 110a may also make correlations between received data, and further make calculations, measurements, and determinations based on data received at a predetermined period of time, predetermined locations, predetermined user(s)/member(s)/user group(s), predetermined third parties, and/or demographics.

Moreover, the recommendation execution cluster 110*a* may, automatically or in response to a user request, generate one or more user profiles. For example, in response to receiving data (e.g., user online history, user preferences for a travel-related product or service, information parsed from user electronic messages, user transaction history), the recommendation execution cluster 110*a* may create a user profile and store the user profile in the data warehouse 110*b*. As updated information corresponding to the user is received, the user recommendation profile may be modified to align with the updated information. The recommendation execution cluster 110*a* may further determine how the aforementioned algorithms should be implemented or modified and how a recommendation should be transmitted and displayed to a user. The recommendation execution cluster 110*a* may additionally conduct bandwidth-latency analysis to ensure that the personal computing device 102 corresponding to a user is accessing the a data warehouse 110*b* and/or recommendation execution cluster 110*a* in closest proximity to the user personal computing device 102 or that the personal computing device 102 data is being received at the data warehouse 110*b* and/or recommendation execution cluster 110*a* with the lowest latency at the time the recommendation to the user is made. Migrating the data associated with the user to the travel recommendation system 110 components (i.e. recommendation execution cluster 110*a* and data warehouse 110*b*) in closest geographic proximity to the user or the travel recommendation system 110 components with the least latency, provides the user with the recommendation in the shortest amount of time possible on the network and opens bandwidth for additional users accessing the network 104. As such, data associated with the user may be migrated between travel recommendation system 110 components, as the known location of the user changes in a geographic region (e.g. if the user is actively traveling).

Figure 2:
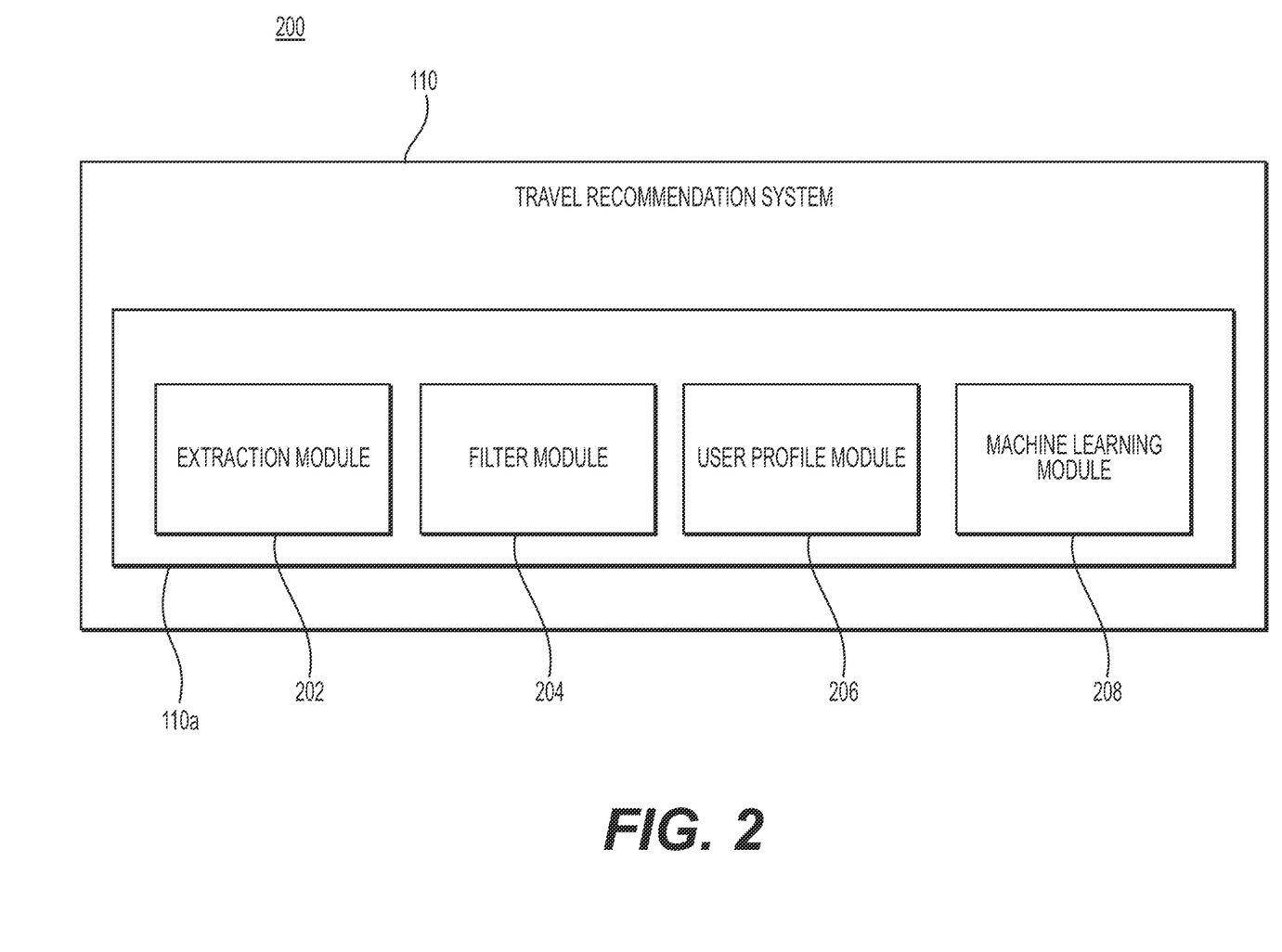
FIG. 2 is a block diagram illustrating various computer system modules for implementing processes for recommending and displaying travel-related icons and data elements.

FIG. 2 is a block diagram illustrating various modules for implementing processes for recommending travel-related offerings via the recommendation execution cluster 110*a* of the travel recommendation system 110. As shown in FIG. 2, recommendation execution cluster 110*a* may comprise an extraction module 202, filter module 204, user profile module 206, and/or machine learning module 208. In some embodiments, extraction module 202, filter module 204, user profile module 206, and/or machine learning module 208 may operate to perform any or all of the computer method steps or algorithms described herein. However, it should be appreciated that the specific software modules depicted in FIG. 2 are only exemplary in nature, and that additional modules may be configured, or that depicted modules may be divided into separate modules based on their desired functions, or that separate modules may be combined based on their desired function.

In one embodiment, the extraction module 202 may implement instructions for aggregating and parsing data from one or more electronic communication services (or applications) associated with the user in order to identify travel-related data. Multiple techniques exist to extract data from HTML documents, specifically e-mail. First, data may be extracted based on manually defined extraction rules that were defined with respect to a set of corresponding clusters or messages templates. Each rule is defined in an offline manner and applied online. Alternatively, automated methods of generating extraction rules that rely on clustering methods of machine generated messages may be used, such as those disclosed in Automated Extractions for Machine Generated Mail, published Apr. 23, 2018, and herein incorporated in its entirety by reference (https://research.yahoo.com/publications/8972/automated-extractions-machine-generated-mail). Finally, online extraction processes may be used that are based on entity recognition and other NLP methods. Thus, the extraction module 202 may implement automated extraction methods, rule based extraction methods, and/or entity recognition natural language processing methods.

The extraction module 202 may aggregate data from one or more of the external data server(s) 106, electronic communication server(s) 108, and or data warehouse 110*b* in order to identify travel-related data, such as new travel itineraries, future hotel arrangements, or venue/conference registration confirmation details. The extraction module 202 may, where appropriate, cluster extracted data into trips (e.g., past present, and/or future) based on temporal and/or location-based proximity data. The extraction module identify or infer properties of clustered trips; for example:

a. Purpose: such as business or leisure.

b. Group composition: such as single, couple, family, group, elderly.

c. Destinations: such as locations or specific venues.

d. Airlines: such as company name, seat class, type, and meal preference.

e. Transportation methods: such as ran, cruise, ferry, or rented car.

f. Restaurants: and related features such as type of food and costs.

g. Activities: such as theme parks, museums, tours or concerts.

h. Timeframe: as extracted from airlines itinerary, etc.

The extraction module 202 may additionally aggregate non-travel-related data in furtherance of generating a holistic user profile indicative of user interest, prior transactions, user activities, and demographic information (e.g., user gender, age, location, marital state (either submitted or inferred)).

The filter module 204 may implement instructions for filtering vender services (i.e., third parties such as airlines, credit card companies, reward/loyalty membership providers, excursion providers, train companies, hotels, cruise ships, restaurants, theme parks, car rental companies, and ride sharing companies) information (i.e., current, past, and future offerings to engage with their services and/or products) and historical travel information corresponding to the user, based on or in furtherance of the travel-related data identified by the extraction module 202. The filter module 204 may determine that certain user travel interests have already been purchased, for example, a non-refundable flight, and remove vender service offerings pertaining to air travel from a list of candidate offers.

The user profile module 206 may generate and maintain a user profile based on historical information (i.e., previous travel, prior purchases, and travel corresponding to friends and/or social media relationships) corresponding to the user. As updated information relevant or corresponding to the user becomes available the user profile module 206 may update the user profile. The user profile module 206 may update the user profile in response to one or more machine learning models. The user profile module 206 may also be used, in parallel, to generate trip profiles, as desired.

The machine learning module 208 may implement one or machine learning techniques and further leverage the generated user profile, identified travel-related information, and the list of candidate offers from the one or more vender services of each model to associate each candidate with a score according to its relevance to the user and the identified travel-related information. In order to train aggregated data points extracted from identified travel-related information, user data related to the features of a past, present, or future trip must be identified. Features, such as user demographic data (e.g., age, gender, location and marital state), loyalty programs and status information (such as accumulated mileage, etc.), past trips information (e.g. frequently visited destinations, preferred airlines and car rental companies, etc.), and upcoming trip data (e.g. purpose and destination, the participants' composition, and any existing reservations for activities or services, such as car rental, museum tickets, etc.) are used to generate related features.

Similar feature identification processes are implemented as it pertains to vender candidate offerings. For example, vendor candidate offerings are analyzed to generate candidate features, such as location, duration, price, of an experience, accommodation, good, or service. Additionally, some candidate features can be dynamically calculated using aggregated data from a plurality of users. For example, a key feature can be the popularity of an activity or an airline, given the user trip destination. Given the vast amount of aggregated data corresponding to one or more users and their trips, labels may be produced to categorize data in the following iterative manner: (1) a user trip may be randomly sampled from identified travel-related data; (2) key event trip data for a user trip is identified and ordered (e.g., chronologically) according to a timeline; (3) a key event may be randomly sampled from the trip data; (4) a key event occurring at a specific point in time is randomly selected from identified and ordered key event trip data; (5) the user profile and trip data that was available at the specific point in time is aggregated to create and/or update the user's profile and the profile of the upcoming trip; (6) an initial list of vendor candidate offerings that are available at the specific point in time are retrieved; (7) the vendor candidate offerings are matched against key events of the user trip and based on relevancy to the key event; and each vendor candidate offering matching a key event in the user trip is labelled as relevant and the remaining vendor candidate offerings are labelled as irrelevant; (8) these processes may automatically repeat as necessary until all key events are matched and/or all vender candidate offerings are exhausted. The candidate offerings exceeding a threshold or candidate offerings of certain according to a ranking model, may be selected and potentially presented to the user.

Figure 3:
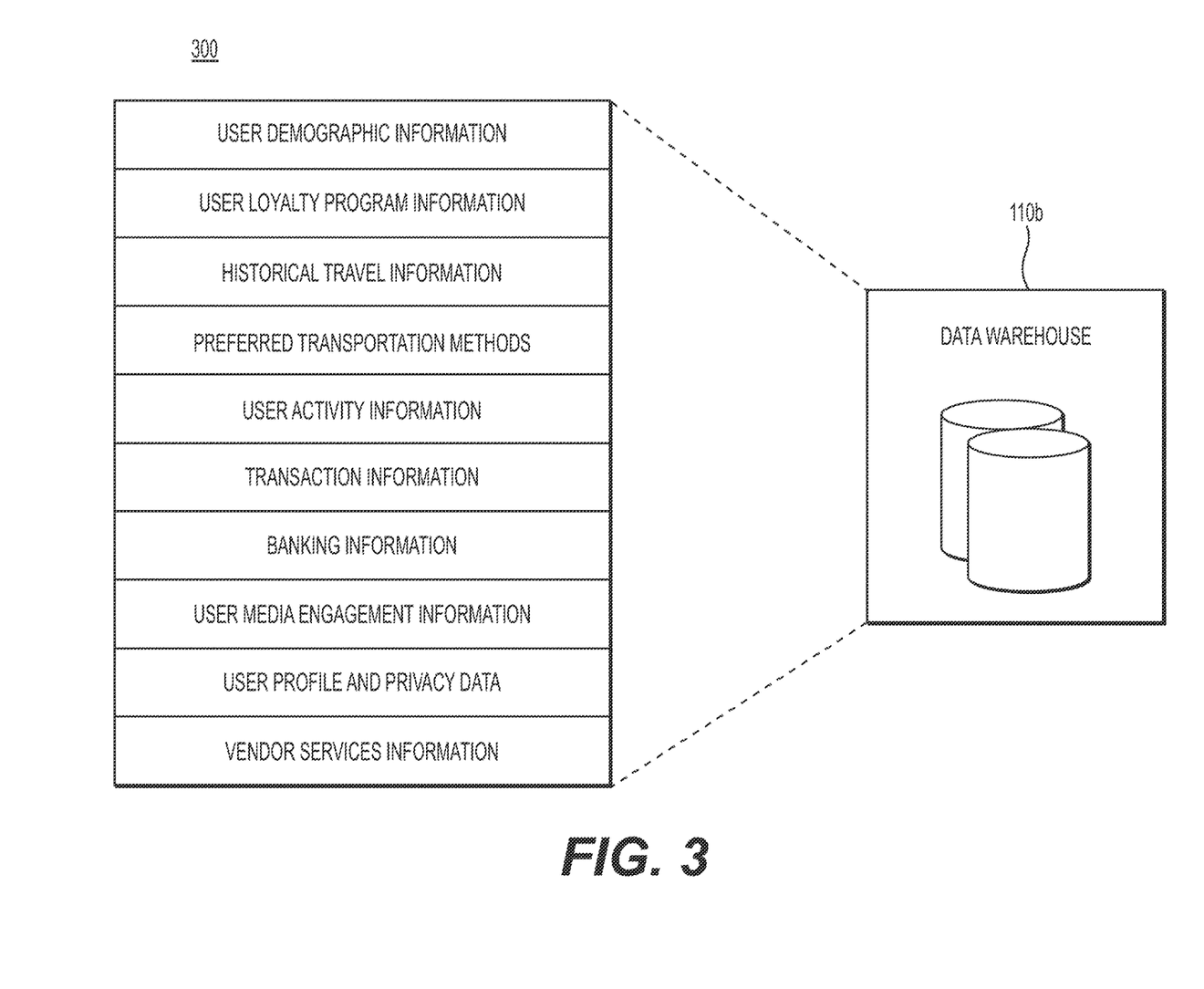
FIG. 3 is a block diagram illustrating the types of travel-related data, user data, and historical data that are stored in a data warehouse of the computer system of FIG. 1.

FIG. 3 is a block diagram illustrating the types of data that may be stored in the data warehouse 110*b*. According to some embodiments, the data warehouse 110*b* may be configured to store data related to: user data, user profile data, user media engagement, and travel information, etc. In some embodiments, the user data can pertain to user demographic information (e.g., age, marital status, employment, nationality, location, home address, etc.), user loyalty program information (e.g., credit card rewards, hotel rewards, airline rewards, ride-sharing rewards, and points or account information associated thereof), historical user travel information (or historical information pertaining to the user's immediate family or friends), user preferred transportation methods, user activity information (e.g., preferred excursions, restaurant preferences, shopping interests, etc.), transaction information (e.g., information parsed from receipts send to the users email or text message application, or invoices), banking information (e.g., bank statements, account balances, credit score, user credit available, etc.) user media engagement (e.g., shows watched, movie ticket purchases, social media engagement, picture meta data, video meta data, genealogy website data, etc.), user profile and privacy preferences, and vendor services information (e.g., current offerings from third parties, electronic promotions, coupons, rewards, loyalty points, advertisements, etc.), user device information, including, but not limited to, device identifying information, device capability information, voice/data carrier information, Internet Protocol (IP) address, applications installed or capable of being installed or executed on such device, and/or any, or some combination thereof. According to some embodiments, the stored user data can also include, but is not limited to, information associated with a user's behavioral information, user attributes, user biographic information, and the like, or some combination thereof. According to some embodiments, data warehouse 110*b* may be configured to store data and metadata associated with user communications from an assortment of telephony, internet, and media service providers and/or platforms. Such data can be derived from information provided by the user, a service provider (e.g. Verizon®), by the vendors (e.g., Kayak®, Orbitz®, Expedia®, American Airlines®, Marriott®), or by other third party services, or some combination thereof. It should be understood that the data (and metadata) stored in the data warehouse 110*b* may be any type of information related to a user/member/user group, content, a device, an application, a service provider, a content provider, whether known or to be known, without departing from the scope of the present disclosure.

Figure 4:
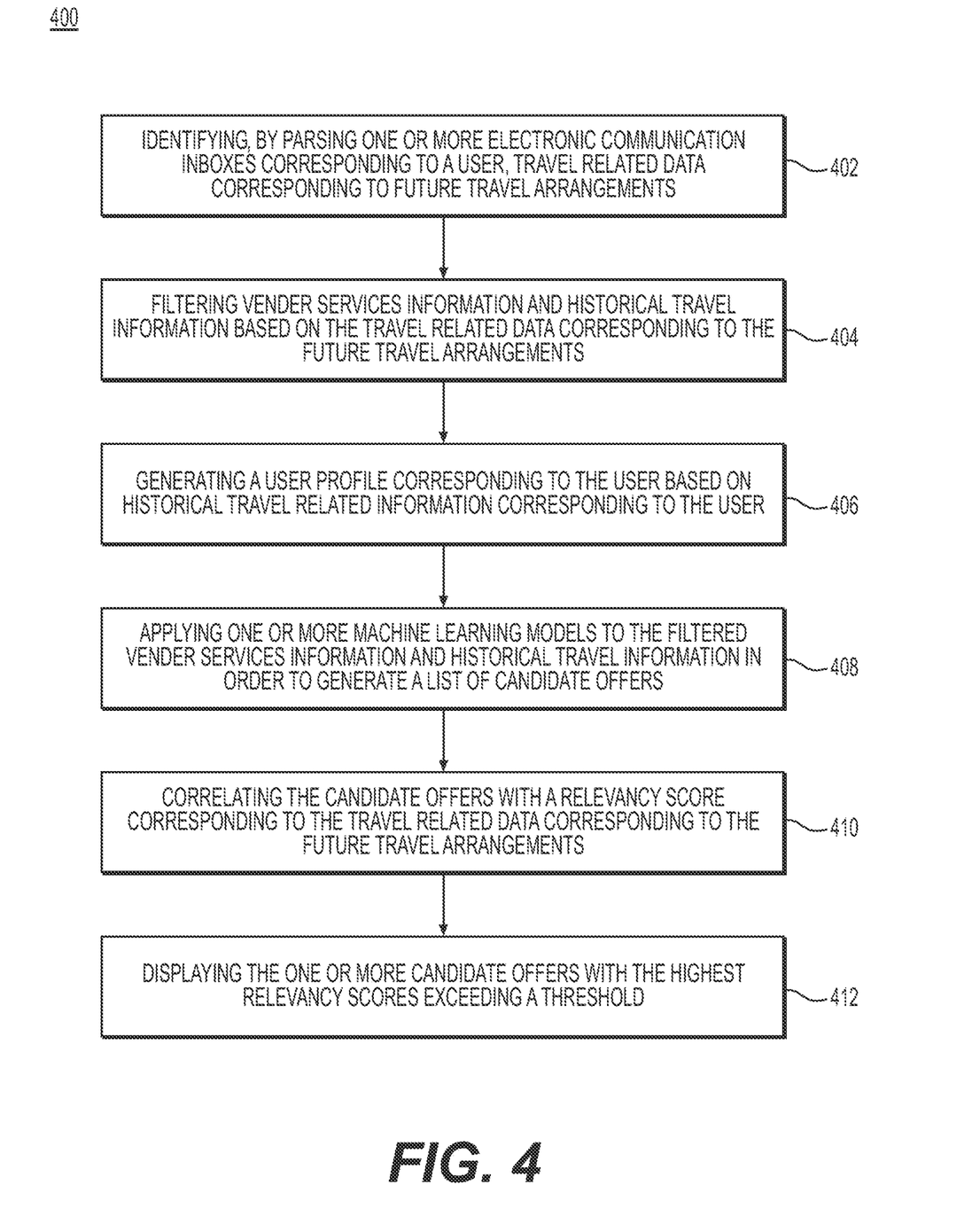
FIG. 4 is a flow diagram illustrating steps of a method for recommending and displaying travel-related icons and data elements, performed in accordance with some embodiments of the present disclosure.

FIG. 4 is a flow diagram illustrating steps performed in accordance with some embodiments of the present disclosure. The travel recommendation system 110 may automatically or in response to user instruction, identify, by parsing one or more electronic communication inboxes corresponding to the user, travel-related data corresponding to future travel arrangements (Step 402). For example, by parsing a user's email inbox the travel recommendation system 110 may identify future travel arrangements corresponding to the user. Concurrently or at another point in time, the travel recommendation system 110 may filter vender services information and historical travel information based on the travel-related data (e.g. future travel arrangements) corresponding to the user (Step 404). For example, the travel recommendation system 110 may filter one or more vender offers based on relevancy to the future travel arrangements corresponding to the user. The travel recommendation system 110 may generate a user profile corresponding to a user based on historical travel-related information corresponding to the user (Step 406). For example the travel recommendation system 110 may generate and maintain a user profile based on historical information (i.e., previous travel, prior purchases, and travel corresponding to friends and/or social media relationships) corresponding to the user. As updated information relevant or corresponding to the user becomes available, the travel recommendation system 110 may update the user profile. The travel recommendation system 110 may update the user profile in response to one or more machine learning models (Step 408). The travel recommendation system 110 may apply one or more machine learning models to the filtered vender services information in order to generate a list of candidate offers. For example, the travel recommendation system 110 may implement one or more machine learning techniques and further leverage the generated user profile, identified travel-related information, and the list of candidate offers from the one or more vender services in model to associate each candidate with a score according to its relevance to the user and the identified travel-related information. The travel recommendation system 110 may correlate the candidate offers with a relevancy score corresponding to the identified travel-related data (Step 410). For example, the travel recommendation system 110 may correlate the candidate offers from the vendors with a relevancy score corresponding to the identified future travel arrangements. The travel recommendation system 110 may transmit the one or more candidate offers with the highest relevancy scores exceeding a threshold to be displayed on a personal computing device corresponding to the user. For example, the travel recommendation system 110 may transmit one or more candidate offers in travel-centric views or tabs within an email user interface, or as native advertisement interstitially displayed alongside content inside or outside an email application, interface, and/or web browser.

Figure 5:
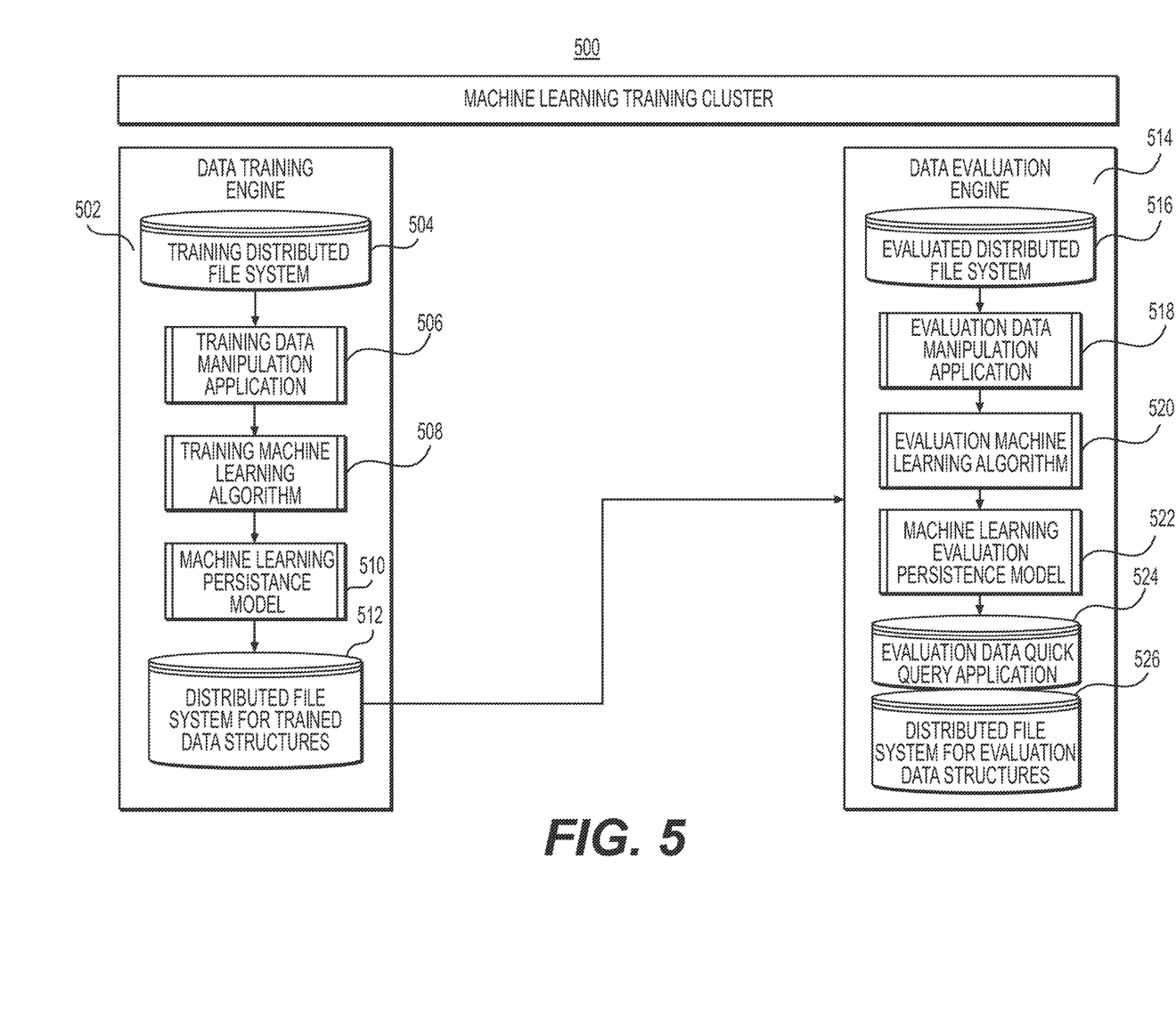
FIG. 5 depicts a block diagram of an exemplary computing architecture of an exemplary machine learning system and machine learning algorithm for recommending and displaying travel-related icons and data elements.

FIG. 5 depicts a block diagram of an exemplary architecture diagram of an exemplary machine learning system and machine learning algorithm for recommending travel-related offerings. As shown in FIG. 5, in coordination with machine learning module 208 or as an independent system with independent processes, machine learning system and environment 500 may comprise a data training engine 302, and a data evaluation engine 514. Training data in the data training engine 502 may be trained daily over a time period (e.g., a predetermined time period), usually months, and initially stored in a training distributed file system 504 (e.g., one or more databases). A training data manipulation application 506 may call for the training data to be input from the training distributed file system 504 and further prepare the training data to be analyzed. Once the training data is in condition to be trained, it is obtained from the training data manipulation application 506 by a training machine learning algorithm 508. The training machine learning algorithm 508 processes the training data with its model(s) to further fine tune both the data being analyzed and the machine algorithm itself. The training machine learning algorithm 508 then inputs the training data into a machine learning persistence model 510, which becomes the baseline algorithm for analyzing training data. During this transition from the initial training machine learning algorithm 508 to the machine learning persistence model 510, previous training machine learning algorithms are stored for potential later use. The machine learning persistence model 510 and the training data that is output from the machine learning persistence model 510 are stored in the distributed file system for trained data structures 512. The machine learning persistence model 510 is then input into the data evaluation engine 514, wherein the training data may be reclassified as evaluation data.

Evaluation data in the data evaluation engine 514, is analyzed and evaluated over a time period (e.g. a predetermined time period), usually hourly, and is initially stored in an evaluation distributed file system 516. An evaluation data manipulation application 518 calls for the evaluation data to be input from the evaluation distributed file system (e.g. one or more databases) 516 and further prepares the evaluation data to be analyzed. Once the evaluation data is in condition to be analyzed, it is obtained by an evaluation machine learning algorithm 520 from the evaluation data manipulation application 518. The evaluation machine learning algorithm 520 processes the evaluation data with its model(s) to further fine tune both the data being analyzed and the machine algorithm itself. The evaluation machine learning algorithm 520 then inputs the training data into a machine learning evaluation persistence model 522, which is a model(s) that is chosen to be the baseline algorithm for analyzing evaluation data. During this transition from the initial evaluation machine learning algorithm 520 to the machine learning evaluation persistence model 522, previous evaluation machine learning algorithms are stored for potential later use. The machine learning evaluation persistence model 522 and the evaluation data that is output from the machine learning evaluation persistence model 522 and are processed by the evaluation data quick query application 526 and stored in the distributed file system for evaluation data structures 526. The machine learning system and environment 500 may implement:

Supervised learning
Unsupervised learning
Reinforcement learning
Semi-supervised learning The machine learning system and environment 300 may implement one or more of the following algorithms, including but not limited to:

Regression:
Ordinary Least Squares Regression (OLSR)
Linear Regression
Logistic Regression
Stepwise Regression
Multivariate Adaptive Regression Splines (MARS)
Locally Estimated Scatterplot Smoothing (LOESS)
Instance-based:
k-Nearest Neighbor (kNN)
Learning Vector Quantization (LVQ)
Self-Organizing Map (SOM)
Locally Weighted Learning (LWL)
Regularization:
Ridge Regression
Least Absolute Shrinkage and Selection Operator (LASSO)
Elastic Net
Least-Angle Regression (LARS) Decision Tree:
Random Forest
Classification and Regression Tree (CART)
Iterative Dichotomiser 3 (ID3)
C4.5 and C5.0 (different versions of a powerful approach)
Chi-squared Automatic Interaction Detection (CHAID)
Decision Stump
M5
Conditional Decision Trees
Bayesian:
Naive Bayes
Gaussian Naive Bayes
Multinomial Naive Bayes
Averaged One-Dependence Estimators (AODE)
Bayesian Belief Network (BBN)
Bayesian Network (BN)
Clustering:
k-Means
k-Medians
Expectation Maximization (EM)
Hierarchical Clustering
Association Rule Learning:
Apriori algorithm
Eclat algorithm
Deep Learning Algorithms:
Deep Boltzmann Machine (DBM)
Deep Belief Networks (DBN)
Convolutional Neural Network (CNN)
Stacked Auto-Encoders Dimensionality Reduction Algorithms:
Principal Component Analysis (PCA)
Principal Component Regression (PCR)
Partial Least Squares Regression (PLSR)
Sammon Mapping
Multidimensional Scaling (MDS)
Projection Pursuit
Linear Discriminant Analysis (LDA)
Mixture Discriminant Analysis (MDA)
Quadratic Discriminant Analysis (QDA)
Flexible Discriminant Analysis (FDA)
Ensemble:
Boosting
Bootstrapped Aggregation (Bagging)
AdaBoost
Stacked Generalization (blending)
Gradient Boosting Machines (GBM)
Gradient Boosted Regression Trees (GBRT)

In one embodiment, ranking accuracy may be measured by the following equation:

Ordered Area Under Curve $$OAUC = \frac{\sum_{a_{r_i}} (r_i - i)}{\lfloor \frac{n}{2} \rfloor \sum_{i=1}^{\lfloor \frac{n}{2} \rfloor} (\lfloor \frac{n}{2} \rfloor + i)}$$

Figure 6:
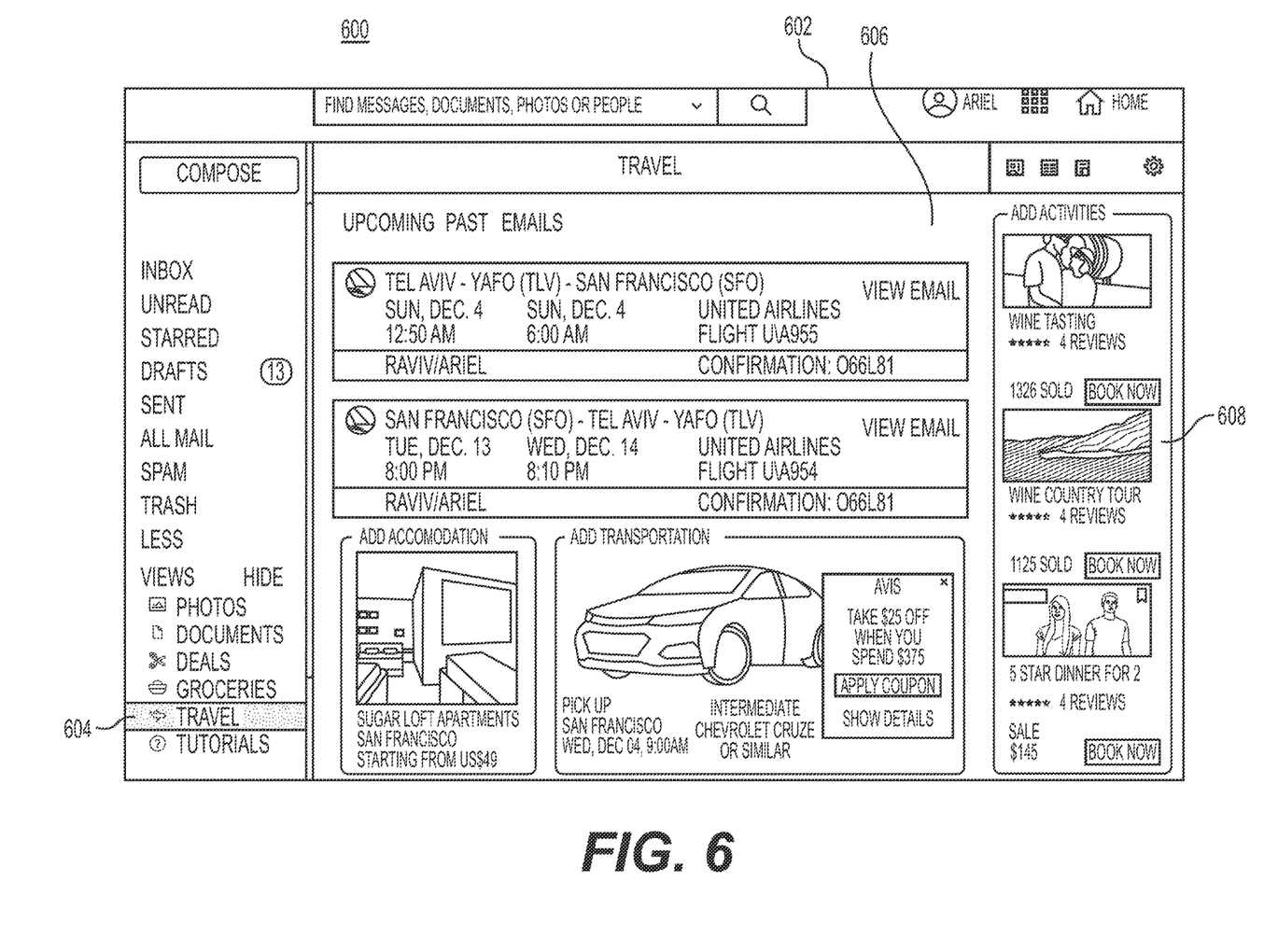
FIG. 6 depicts a graphical interface for recommending and displaying travel-related icons and data elements to a user.

FIG. 6 depicts a graphical interface for presenting recommendations to a user. Graphical interface environment 600 may be associated with a standalone application or a web browser, and further provide an interface on a personal computing device 102, so that travel-related offerings can be presented to a user in a travel-centric view or tab and/or as a native advertisement interstitially displayed alongside additional content. In one non-exclusive example, graphical interface 602 may be a feature of an email application or a web browser presenting email related information. The graphical interface 602 may comprise a travel tab 604, which if selected by a user, may direct the user to a new view (or web page) within the email application or web browser, such that travel-related information (e.g. past, present, or future travel itineraries) 606 are displayed. In addition to past, present, or future travel itineraries, travel-related information 606, such travel alerts, transportation alternatives, and booking options, may be natively and dynamically presented to the user. Alongside the travel-related information 606, candidate offers 608 that exceed a threshold (Step 412) as determined by the travel recommendation system 110, may be interstitially displayed. For example, the candidate offers 608 may be add-on activities recommended to the user based on the travel-related information 606 displayed as a result of the user selecting the travel tab 604.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software, for example virtual servers, and one or more database systems and application software that support the services provided by the server. Cloud servers are examples.

For the purposes of this disclosure, a "network" should be understood to refer to a network that may couple devices so that communications may be exchanged, such as between a server and a personal computing device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof Likewise, sub-networks, which may employ differing architectures or may be compliant or compatible with differing protocols, may intemperate within a larger network.

For purposes of this disclosure, a "wireless network" should be understood to couple personal computing devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.IIb/g/n, or the like. Network access technologies may enable wide area coverage for devices, such as personal computing devices with varying degrees of mobility, for example.

In short, a wireless network may include virtually any type of wireless communication mechanism by which signals may be communicated between devices, such as a personal computing device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a personal computing device may include a computing device capable of sending or receiving signals, such as via a wired or a wireless network. A personal computing device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A personal computing device may vary in terms of capabilities or features. Claimed subject matter is intended to cover a wide range of potential variations, such as a web-enabled personal computing device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display and components for displaying augmented reality objects, for example.

A personal computing device may include or may execute a variety of possible applications, such as a client software application enabling communication with other devices. A personal computing device may also include or execute an application to communicate content, such as, for example, textual content, multimedia content, or the like. A personal computing device may also include or execute an application to perform a variety of possible tasks, such as: browsing, searching, connecting to a network (e.g. the internet), receiving communications (e.g. phone call, emails, text messages, social media communications), streaming or displaying various forms of content, including locally stored or uploaded images and/or video, or games (such as live video calls).

What is claimed is:

1. A computer-implemented method for transmitting customized electronic content to one or more user devices, the method comprising:

receiving, by a first cluster processor, first user data from one of a first vendor server and a first user device, each of the first user data and the first user device associated with a first user, the first user device in communication with the first cluster processor via a network;

based on receiving the first user data, generating, by the first cluster processor, a first user profile for identifying the first user;

determining, by the first server cluster, a bandwidth-latency of the communication between the first user device and the first cluster processor, wherein determining the bandwidth-latency includes one of: i) determining a closest proximity between the first user device and any one of a plurality of server clusters, and ii) determining whether the first user data is being received by any one of the plurality of server clusters with a lowest latency;

parsing, by the first cluster processor, one or more electronic communication inboxes of one of the first vendor server and a second vendor server, the one or more electronic communication inboxes corresponding to the first user, the parsing of the one or more electronic communication inboxes for identifying target content of the first user;

based on parsing the one or more electronic communication inboxes, filtering, by the first cluster processor, the target content of the first user for at least one of first vendor information, second vendor information, and historical data of the first user;

based on filtering the target content of the first user, determining, by the first cluster processor, a relevancy score for one or more customized electronic content elements based on applying one or more machine learning models to one of the first service information, the second vendor information, and the historical data of the first user;

based on the relevancy score determined for the one or more customized electronic content elements, determining, by the first cluster processor, one of a ranking order and a minimum ranking threshold for presenting the one or more customized electronic content elements to the first user; and transmitting, by the first cluster processor, the one or more elements of customized electronic content elements exceeding the minimum ranking threshold to the first user device for display to the first user, the one or more elements of customized electronic content elements displaying on the first user device in the ranking order.

2. The computer-implemented method of claim 1, wherein parsing the one or more electronic communication inboxes include parsing one of an email inbox and a text message inbox; and further includes parsing an entire mailbox corresponding to the email inbox or text message inbox.

3. The computer-implemented method of claim 2, further comprising:
parsing the entire mailbox corresponding to the email inbox or text message inbox by implementing entity recognition natural language processing techniques.

4. The computer-implemented method of claim 1, further comprising:
clustering, via an extraction module, the travel-related data into trips;
identifying trip properties corresponding to the clustered trips; and
associating the clustered trips with past, present, and future travel arrangements.

5. The computer-implemented method of claim 4, wherein trip properties further comprise at least:
one or more of a trip purpose, group composition, or timeframe.

6. The computer-implemented method of claim 1, wherein at least one of the one or more machine learning models are supervised.

7. The computer-implemented method of claim 1, wherein the customized electronic content elements with the highest relevancy scores exceeding a threshold are displayed in an email or text message graphical user interface with a dedicated travel tab.

8. A system comprising:
a storage device that stores instructions for transmitting customized electronic content elements to one or more users; and
at least one processor that executes the instructions to perform a method comprising:
receiving, by a first cluster processor, first user data from one of a first vendor server and a first user device, each of the first user data and the first user device associated with a first user, the first user device interconnected to the first cluster processor via a first communication link;
based on receiving the first user data, generating, by the first cluster processor, a first user profile for identifying the first user;
determining, by the first server cluster, a bandwidth-latency of the communication between the first user device and the first cluster processor, wherein determining the bandwidth-latency includes one of: i) determining a closest proximity between the first user device and any one of a plurality of server clusters, and ii) determining whether the first user data is being received by any one of the plurality of server clusters with a lowest latency;
parsing, by the first cluster processor, one or more electronic communication inboxes of one of the first vendor server and a second vendor server, the one or more electronic communication inboxes corresponding to the first user, the parsing of the one or more electronic communication inboxes for identifying target content of the first user;
based on parsing the one or more electronic communication inboxes, filtering, by the first cluster processor, the target content of the first user for at least one of first vendor information, second vendor information, and historical data of the first user;
based on filtering the target content of the first user, determining, by the first cluster processor, a relevancy score for one or more customized electronic content elements based on applying one or more machine learning models to one of the first service information, the second vendor information, and the historical data of the first user;
based on the relevancy score determined for the one or more customized electronic content elements, determining, by the first cluster processor, one of a ranking order and a minimum ranking threshold for presenting the one or more customized electronic content elements to the first user; and
transmitting, by the first cluster processor, the one or more elements of customized electronic content elements exceeding the minimum ranking threshold to the first user device for display to the first user, the one or more elements of customized electronic content elements displaying on the first user device in the ranking order.

9. The system of claim 8, wherein parsing the one or more electronic communication inboxes include parsing one of an email inbox and a text message inbox; and further includes parsing an entire mailbox corresponding to the email inbox or text message inbox.

10. The system of claim 9, further comprising:
parsing the entire mailbox corresponding to the email inbox or text message inbox by implementing entity recognition natural language processing techniques.

11. The system of claim 8, further comprising:
clustering, via an extraction module, the travel-related data into trips;
identifying trip properties corresponding to the clustered trips; and
associating the clustered trips with past, present, and future travel arrangements.

12. The system of claim 11, wherein trip properties further comprise at least:
one or more of a trip purpose, a group composition, and a timeframe.

13. The system of claim of claim 8,
wherein at least one of the one or more machine learning models are supervised.

14. The computer-implemented method of claim 8,
wherein the one or more travel-related candidate elements with the highest relevancy scores exceeding a threshold are displayed in an email or text message graphical user interface with a dedicated travel tab.

15. A non-transitory computer-readable medium storing instructions for transmitting customized electronic content to one or more user devices, the instructions configured to cause at least one processor to perform a method, the method including
receiving, by a first cluster processor, first user data from one of a first vendor server and a first user device, each of the first user data and the first user device associated with a first user, the first user device interconnected to the first cluster processor via a first communication link;
based on receiving the first user data, generating, by the first cluster processor, a first user profile for identifying the first user;

determining, by the first server cluster, a bandwidth-latency of the communication between the first user device and the first cluster processor, wherein determining the bandwidth-latency includes one of: i) determining a closest proximity between the first user device and any one of a plurality of server clusters, and ii) determining whether the first user data is being received by any one of the plurality of server clusters with a lowest latency;

parsing, by the first cluster processor, one or more electronic communication inboxes of one of the first vendor server and a second vendor server, the one or more electronic communication inboxes corresponding to the first user, the parsing of the one or more electronic communication inboxes for identifying target content of the first user;

based on parsing the one or more electronic communication inboxes, filtering, by the first cluster processor, the target content of the first user for at least one of first vendor information, second vendor information, and historical data of the first user;

based on filtering the target content of the first user, determining, by the first cluster processor, a relevancy score for one or more customized electronic content elements based on applying one or more machine learning models to one of the first service information, the second vendor information, and the historical data of the first user;

based on the relevancy score determined for the one or more customized electronic content elements, determining, by the first cluster processor, one of a ranking order and a minimum ranking threshold for presenting the one or more customized electronic content elements to the first user; and transmitting, by the first cluster processor, the one or more elements of customized electronic content elements exceeding the minimum ranking threshold to the first user device for display to the first user, the one or more elements of customized electronic content elements displaying on the first user device in the ranking order.

16. The non-transitory computer-readable medium of claim 15, wherein parsing the one or more electronic communication inboxes include parsing one of an email inbox and a text message inbox; and further includes parsing an entire mailbox corresponding to one of the email inbox and the text message inbox.

17. The non-transitory computer-readable medium of claim 16, further comprising:
parsing the entire mailbox corresponding to one of the email inbox and the text message inbox by implementing entity recognition natural language processing techniques.

18. The non-transitory computer-readable medium of claim 15, further comprising:
clustering, via an extraction module, the travel-related data into trips;
identifying trip properties corresponding to the clustered trips; and
associating the clustered trips with past, present, and future travel arrangements.

19. The non-transitory computer-readable medium of claim of claim 18, wherein trip properties further comprise at least:
one or more of a trip purpose, a group composition, and a timeframe.

20. The non-transitory computer-readable medium of claim of claim 15, further comprising:
wherein at least one of the one or more machine learning models are supervised.

* * * * *

UNITED STATES PATENT AND TRADEMARK OFFICE
CERTIFICATE OF CORRECTION

| | |
|---|---|
| PATENT NO. | : 11,205,196 B1 |
| APPLICATION NO. | : 16/502911 |
| DATED | : December 21, 2021 |
| INVENTOR(S) | : Ariel Raviv |

It is certified that error appears in the above-identified patent and that said Letters Patent is hereby corrected as shown below:

In the Claims

Claim 13, Column 18 Line 46, delete "of claim of claim" and insert --of claim--.

Claim 14, Column 18 Line 49, delete "computer-implemented method" and insert --system--.

Claim 15, Column 18 Line 58, delete "including" and insert --including:--.

Claim 19, Column 20 Lines 26-27, delete "of claim of claim" and insert --of claim--.

Claim 20, Column 20 Lines 31-32, delete "of claim of claim" and insert --of claim--.

Signed and Sealed this
Twenty-first Day of June, 2022

Katherine Kelly Vidal
*Director of the United States Patent and Trademark Office*